(12) United States Patent
Merry

(10) Patent No.: US 7,854,904 B2
(45) Date of Patent: Dec. 21, 2010

(54) MOUNTING MAT FOR A CATALYTIC CONVERTER

(75) Inventor: Richard P. Merry, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 565 days.

(21) Appl. No.: 10/556,271

(22) PCT Filed: Apr. 16, 2004

(86) PCT No.: PCT/US2004/011761

§ 371 (c)(1),
(2), (4) Date: Nov. 14, 2005

(87) PCT Pub. No.: WO2005/003530

PCT Pub. Date: Jan. 13, 2005

(65) Prior Publication Data

US 2006/0257298 A1  Nov. 16, 2006

(30) Foreign Application Priority Data

Jun. 10, 2003  (EP)  ................... 03101686

(51) Int. Cl.
*B01D 50/00* (2006.01)
(52) U.S. Cl. ...................... 422/179; 422/180
(58) Field of Classification Search ............. 422/171, 422/177, 179, 180, 221
See application file for complete search history.

(56) References Cited

U.S. PATENT DOCUMENTS

| | | | |
|---|---|---|---|
| 3,709,706 A | 1/1973 | Sowman | |
| 3,760,049 A | 9/1973 | Borer et al. | |
| 3,916,057 A | 10/1975 | Hatch et al. | |
| 4,011,651 A | 3/1977 | Bradbury et al. | |
| 4,181,514 A | 1/1980 | Lefkowitz et al. | |
| 4,305,992 A | 12/1981 | Langer et al. | |
| 4,929,429 A | 5/1990 | Merry | |
| 4,999,168 A | 3/1991 | Ten Eyck | |
| 5,028,397 A | 7/1991 | Merry | |
| 5,151,253 A | 9/1992 | Merry et al. | |
| 5,250,269 A | 10/1993 | Langer | |
| 5,290,522 A | 3/1994 | Rogers et al. | |
| 5,380,580 A | 1/1995 | Rogers et al. | |
| 5,580,532 A | 12/1996 | Robinson et al. | |
| 5,585,312 A | 12/1996 | TenEyck et al. | |

(Continued)

FOREIGN PATENT DOCUMENTS

CN  1271623  11/2000

(Continued)

*Primary Examiner*—Tom Duong
(74) *Attorney, Agent, or Firm*—Harold C. Knecht

(57) ABSTRACT

The present invention provides a mounting mat (30) for mounting a pollution control monolith (20) in a pollution control device (10). The mounting mat has a bulk density of 0.12 to 0.3 g/cm³ and comprises (i) a layer of chopped magnesium aluminium silicate glass fibers and (ii) a layer of ceramic fibers obtainable from a sol-gel process. Preferably, the layer of chopped magnesium aluminium silicate glass fibers and the layer of ceramic fibers define opposite major surfaces of the mat. The present invention further provides a pollution control device (10), comprising a pollution control monolith (20) arranged in a metallic casing (11) with the mounting mat (30) disposed between the metallic casing (11) and pollution control monolith (20).

21 Claims, 1 Drawing Sheet

U.S. PATENT DOCUMENTS

| | | |
|---|---|---|
| 5,686,039 A | 11/1997 | Merry |
| 5,736,109 A | 4/1998 | Howorth et al. |
| 5,996,228 A | 12/1999 | Shoji et al. |
| 6,231,818 B1 | 5/2001 | TenEyck |
| 6,455,124 B1 * | 9/2002 | Beall et al. .................. 428/116 |
| 2007/0173403 A1 | 7/2007 | Koike et al. |

FOREIGN PATENT DOCUMENTS

| | | |
|---|---|---|
| EP | 1 314 866 A2 | 5/2003 |
| JP | 5-221741 | 8/1993 |
| WO | WO 9835144 A1 * | 8/1998 |
| WO | WO 00/75496 A1 | 12/2000 |

* cited by examiner

MOUNTING MAT FOR A CATALYTIC CONVERTER

FIELD OF THE INVENTION

The present invention relates to a mounting mat for mounting a pollution control monolith in a pollution control device. In particular the present invention relates to a mounting mat that is comprised of a layer of glass fibers and a layer of ceramic fibers obtainable from a sol-gel process. The invention further relates to a pollution control device.

BACKGROUND OF THE INVENTION

Pollution control devices are universally employed on motor vehicles to control atmospheric pollution. Two types of devices are currently in widespread use—catalytic converters and diesel particulate filters or traps. Catalytic converters contain a catalyst, which is typically coated on a monolithic structure mounted within a metallic housing. The monolithic structures are typically ceramic, although metal monoliths have also been used. The catalyst oxidizes carbon monoxide and hydrocarbons and reduces the oxides of nitrogen in automobile exhaust gases to control atmospheric pollution.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected.

The monoliths and in particular the ceramic pollution control monoliths, used in pollution control devices are fragile and susceptible to vibration or shock damage and breakage. They have a coefficient of thermal expansion generally an order of magnitude less than the metal housing which contains them. This means that as the pollution control device is heated the gap between the inside peripheral wall of the housing and the outer wall of the monolith increases. Even though the metallic housing undergoes a smaller temperature change due to the insulating effect of the mat, the higher coefficient of thermal expansion of the metallic housing causes the housing to expand to a larger peripheral size faster than the expansion of the monolithic element. Such thermal cycling occurs hundreds of times during the life and use of the pollution control device.

To avoid damage to the ceramic monoliths from for example road shock and vibrations, to compensate for the thermal expansion difference, and to prevent exhaust gases from passing between the monolith and metal housing (thereby bypassing the catalyst), mounting mats are disposed between the ceramic monolith and the metal housing. These mats must exert sufficient pressure to hold the monolith in place over the desired temperature range but not so much pressure as to damage the ceramic monolith.

Recently, there has been a trend towards increasing the number of cells that make up the pollution control monolith per unit area and reducing the wall thickness of the cells. Such pollution control monoliths are known as thin wall or ultra-thin wall monoliths and typically have between 400 and 1200 cells per square inch (cpsi) and a wall thickness of not more than 5 mils, i.e., 0.005 inch (0.127 mm). Because of the reduced wall thickness, these monoliths are even more susceptible to damage and accordingly, the mounting mats for mounting such monoliths are subject to more stringent requirements.

Many mounting mats have been described in the art. Known mounting mats include intumescent sheet materials comprised of ceramic fibers, intumescent materials and organic and/or inorganic binders. Intumescent sheet materials useful for mounting a catalytic converter in a housing are described in, for example, U.S. Pat. No. 3,916,057 (Hatch et al.), U.S. Pat. No. 4,305,992 (Langer et al.) U.S. Pat. No. 5,151,253 (Merry et al.) U.S. Pat. No. 5,250,269 (Langer) and U.S. Pat. No. 5,736,109 (Howorth et al.). Intumescent mounting mats have the disadvantage that they may exert too much pressure on the pollution control monolith during use when the pollution control monolith heats up. As a result, intumescent mounting mats are less suitable for mounting thin wall and ultra-thin wall monoliths.

U.S. Pat. No. 5,290,522 describes a catalytic converter having a non-woven, mounting mat comprising at least 60% by weight shot-free high strength magnesium aluminosilicate glass fibers having a diameter greater than 5 micrometers. Such mounting mat may however not have sufficient holding strength to satisfactorily mount thin wall and ultra-thin wall monoliths at high temperature and protect them against shock and damage.

U.S. Pat. No. 5,380,580 discloses a non-woven mat of physically entangled shot-free ceramic oxide fibers. The mat is taught to be useful as filter medium, mounting mat and sound or thermal insulation. In one of the examples, a non-woven mat is disclosed that comprises a layer of a polycrystalline ceramic fiber and a layer of glass fiber. The mat is apparently meant for thermal insulation and would not be readily suitable as a mounting mat for mounting a pollution control monolith in a pollution control device. Also, there is no teaching as to how such a bilayer mat is to be used as a mounting mat.

Non-intumescent mats comprised of polycrystalline ceramic fibers and binder have been proposed for mounting so-called ultra thin-wall monoliths. Examples of non-intumescent mats are described in, for example, U.S. Pat. No. 4,011,651 (Bradbury et al.), U.S. Pat. No. 4,929,429 (Merry), U.S. Pat. No. 5,028,397 (Merry), U.S. Pat. No. 5,996,228 (Shoji et al.), and U.S. Pat. No. 5,580,532 (Robinson et al.). Polycrystalline fibers are typically formed through a sol-gel process as described in, for example, U.S. Pat. No. 3,760,049 whereas other ceramic fibers are typically melt formed. Unfortunately, polycrystalline fibers are much more expensive than melt formed ceramic fibers such as ceramic glass fibers and as a result mounting mats of polycrystalline fibers are often prohibitively expensive.

Accordingly, it is desired to find further mounting mats suitable for mounting pollution control monoliths in a pollution control device and in particular such mounting mats that can be used to mount thin wall or ultra-thin wall monoliths. Preferably such mounting mats provide a good holding force of the monolith particularly at high temperature without exerting too much pressure that could cause damage to the monolith. Preferably, the mounting mat can be produced at low cost and is preferably also environmentally friendly.

SUMMARY OF THE INVENTION

The present invention provides a mounting mat for mounting a pollution control monolith in a pollution control device. The mounting mat has a bulk density of 0.12 to 0.3 g/cm$^3$ and comprises
(i) a layer of chopped magnesium aluminium silicate glass fibers and
(ii) a layer of ceramic fibers obtainable from a sol-gel process.

Preferably, the layer of chopped magnesium aluminium silicate glass fibers and the layer of ceramic fibers define opposite major surfaces of the mat.

The present invention further provides a pollution control device comprising a pollution control monolith arranged in a metallic casing with a mounting mat disposed between the metallic casing and pollution control monolith. The mounting mat comprises (i) a layer of chopped magnesium aluminium silicate glass fibers and (ii) a layer of ceramic fibers obtainable from a sol-gel process.

The mounting mat is arranged such that the layer of ceramic fibers faces the pollution control monolith. The term "facing" includes embodiments where there are no further layers between the monolith and the ceramic fiber layer of the mat as well as embodiments where one or more further layers are present there between. Such optional layers may or not be part of the mounting mat but when present are preferably not part of the mounting mat, and can include, for example, coatings, scrims, or films aimed at reducing possible skin irritation from the fibers. Also, any such optional layers should be selected such that they do not substantially destroy the advantages of the invention, i.e., the performance of the mounting mat with any such optional layers should be at least 90% of the performance of a similar mat without the optional layer(s).

It was found that the mounting mat according to the invention can be produced at a much lower cost than mounting mats based on a single layer of polycrystalline fibers. Also, when mounting the pollution control monolith in the pollution control device in such a way that the layer of the ceramic fibers obtainable from a sol-gel process faces the monolith, a sufficient holding force can be maintained both at low and high temperatures and during the cycling between low and high temperature during the life time of the pollution control device that occurs when the pollution control device is used in for example a motor vehicle.

BRIEF DESCRIPTION OF THE DRAWINGS

Solely for the purpose of illustration and better understanding of the invention and without the intention to limit the invention in any way thereto, the following drawings are provided.

DETAILED DESCRIPTION OF THE PRESENT INVENTION

Figure 1:
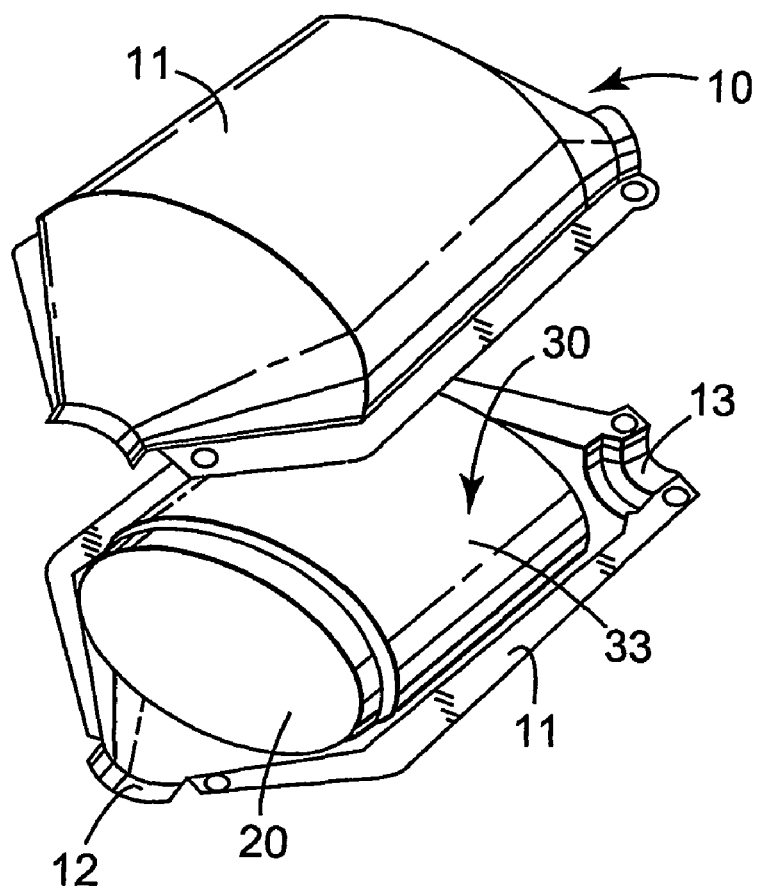
FIG. 1 is a perspective view of a catalytic converter of the present invention shown in disassembled relation.

Referring to FIG. 1, pollution control device 10 comprises metallic casing 11 with generally frusto-conical inlet and outlet ends 12 and 13, respectively. Disposed within casing 11 is a pollution control monolith 20. Surrounding pollution control monolith 20 is mounting mat 30 according to the invention and which serves to tightly but resiliently support monolithic element 20 within the casing 11. Mounting mat 30 holds pollution control monolith 20 in place in the casing and seals the gap between the pollution control monolith 20 and casing 11 to thus prevent or minimize exhaust gases from by-passing pollution control monolith 20.

The metallic casing can be made from materials known in the art for such use including stainless steel.

Pollution control monoliths that can be mounted with the mounting mat of the invention include gasoline pollution control monoliths as well as diesel pollution control monoliths. The pollution control monolith may be a catalytic converter or a particulate filter or trap. Catalytic converters contain a catalyst, which is typically coated on a monolithic structure mounted within a metallic housing. The catalyst is typically adapted to be operative and effective at the requisite temperature. For example, for use with a gasoline engine the catalytic converter should be effective at a temperature of 400° C. to 950° C., whereas for a diesel engine lower temperatures, typically not more than 350° C. are common. The monolithic structures are typically ceramic, although metal monoliths have also been used. The catalyst oxidizes carbon monoxide and hydrocarbons and reduces the oxides of nitrogen in exhaust gases to control atmospheric pollution. While in a gasoline engine all three of these pollutants can be reacted simultaneously in a so-called "three way converter", most diesel engines are equipped with only a diesel oxidation catalytic converter. Catalytic converters for reducing the oxides of nitrogen, which are only in limited use today for diesel engines, generally consist of a separate catalytic converter. Examples of pollution control monoliths for use with a gasoline engine include those made of cordierite that are commercially available from Corning Inc. (Corning, N.Y.) or NGK Insulators, LTD. (Nagoya, Japan) or metal monoliths commercially available from Emitec (Lohmar, Germany).

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable diesel particulate filters made of cordierite are commercially available from Corning Inc. (Corning N.Y.) and NGK Insulators, Inc. (Nagoya, Japan). Diesel particulate filters made of silicon carbide are commercially available from Ibiden Co. Ltd. (Japan) and are described in, for example, JP 2002047070A.

The mounting mat of the present invention can be used to mount so-called thin wall or ultra-thin wall pollution control monoliths. In particular, the mounting mat can be used to mount pollution control monoliths that have from 400 to 1200 cpsi and that have wall thickness of not more than 0.005 (0.127 mm). Examples of pollution control monoliths that may be mounted with the mounting mat include thin wall monoliths 4 mil/400 cpsi and 4 mil/600 cpsi and ultra-thin-wall monoliths 3 mil/600 cpsi, 2 mil/900 cpsi and 2 mil/1200 cpsi.

Figure 2:
FIG. 2 schematically shows a cross-section of a mounting mat according to the invention.

FIG. 2 shows a schematic cross-section of a mounting mat according to the invention. As can be seen, mounting mat 30 comprises a layer 31 of chopped magnesium aluminium silicate glass fibers and a layer 32 of ceramic fibers that can be obtained from a sol-gel process. When used to mount a pollution control monolith in pollution control devices, the mounting mat 30 is arranged such that layer 32 is closest to the pollution control monolith, i.e., face the pollution control monolith and layer 31 is closest to metallic housing of the pollution control device, i.e., face the latter. Thus, layer 31 defines surface 33 of mounting mat 30 in FIG. 1 and layer 32 defines the opposite surface (not visible in FIG. 1) of mounting mat 30. It was found that the opposite arrangement in which layer 32 would define the surface 33 of mounting mat 30 does not provide the benefits associated with the invention.

While FIG. 2 shows a configuration of a mounting mat composed of only two layers, it will be understood that the mat may contain further layers. For example, layers of different fiber composition may be included between layers 31 and 32 shown in FIG. 2. Also, more than one layer of glass fibers can be used whereby the layers may differ for example in the chemical composition of the glass fibers making up the layers and/or the dimensions of the glass fibers making up the composition. Thus, instead of a single layer 31 of glass fibers, two or more layers of glass fibers may be used in combination with layer 32 of ceramic fibers formed from a sol-gel process. For example, the mounting mat may comprise a layer of ceramic fibers formed from a sol-gel process, a glass fiber layer made or S2-glass and a glass fiber layer made of R- or E-glass.

Mounting mat 30 generally has a bulk density, i.e., the density before mounting in the pollution control device, between 0.12 and 0.3 g/cm$^3$, preferably between 0.12 and 0.25 g/cm$^3$. When mounted the mat typically will have a mount density of 0.2 to 0.6 g/cm$^3$, preferably between 0.3 and 0.5 g/cm$^3$, i.e., the mat will be compressed when mounted.

The mounting mat will typically be designed such that when mounted, the thickness of the layer of ceramic fibers obtainable from a sol-gel process is at least 0.5 mm and preferably at least 0.7 mm. However, depending on the nature and type of the pollution control monolith, a smaller thickness is contemplated as well. Generally, however, the thickness of the ceramic fiber layer should be sufficient to thermally insulate the layer of the glass fibers.

The magnesium aluminium silicate glass fibers used in the non-woven mounting mat typically have an average diameter of at least 5 μm and a length between 0.5 and 15 cm, preferably between 1 and 12 cm. Preferably, the average diameter will be at least 7 μm and is typically in the range of 7 to 14 μm. The glass fibers are preferably individualized. To provide individualized (i.e., separate each fiber from each other) fibers, a tow or yarn of fibers can be chopped, for example, using a glass roving cutter (commercially available, for example, under the trade designation "MODEL 90 GLASS ROVING CUTTER" from Finn & Fram, Inc., of Pacoma, Calif.), to the desired length (typically in the range from about 0.5 to about 15 cm). The fibers typically are shot free or contain a very low amount of shot, typically less than 1% by weight based on total weight of fibers. Additionally, the fibers are typically reasonably uniform in diameter, i.e. the amount of fibers having a diameter within +/−3 μm of the average is generally at least 70% by weight, preferably at least 80% by weight and most preferably at least 90% by weight of the total weight of the magnesium aluminium silicate glass fibers.

The magnesium aluminium silicate glass fibers preferably comprise between 10 and 30% by weight of aluminium oxide, between 52 and 70% by weight of silicium oxide and between 1 and 12% of magnesium oxide. The weight percentage of the aforementioned oxides are based on the theoretical amount of $Al_2O_3$, $SiO_2$ and MgO. It will further be understood that the magnesium aluminium silicate glass fiber may contain additional oxides. For example, additional oxides that may be present include sodium or potassium oxides, boron oxide and calcium oxide. Particular examples of magnesium aluminium silicate glass fibers include E-glass fibers which typically have a composition of about 55% of $SiO_2$, 11% of $Al_2O_3$, 6% of $B_2O_3$, 18% of CaO, 5% of MgO and 5% of other oxides; S and S-2 glass fibers which typically have a composition of about 65% of $SiO_2$, 25% of $Al_2O_3$ and 10% of MgO and R-glass fibers which typically have a composition of 60% of $SiO_2$, 25% of $Al_2O_3$, 9% of CaO and 6% of MgO. E-glass, S-glass and S-2 glass are available for example from Advanced Glassfiber Yarns LLC and R-glass is available from Saint-Gobain Vetrotex.

The glass fiber layer of the mat may contain up to 10% by weight of fibers other than magnesium aluminium silicate glass fibers. Preferably however, the glass fiber layer will consist of only magnesium aluminium silicate glass fibers. If other fibers are contained in the glass fiber layer, they will typically be amorphous fibers and they should preferably also have an average diameter of at least 5 μm. Preferably, the glass fiber layer will be free or essentially free of fibers that have a diameter of 3 μm or less, more preferably the mat will be free or essentially free of fibers that have a diameter of less than 5 μm. Essentially free here means that the amount of such small diameter fibers is not more than 2% by weight, preferably not more than 1% by weight of the total weight of fibers in the glass fiber layer.

The ceramic fiber layer comprises ceramic fibers that are obtained from a sol-gel process. By the term "sol-gel" process is meant that the fibers are formed by spinning or extruding a solution or dispersion or a generally viscous concentrate of the constituting components of the fibers or precursors thereof. The sol-gel process is thus to be contrasted with a process of melt forming fibers whereby the fibers are formed by extruding a melt of the components of the fibers. A suitable sol-gel process is for example disclosed in U.S. Pat. No. 3,760,049 wherein there is taught to form the ceramic fibers by extruding a solution or dispersion of metal compounds through orifices thereby forming continuous green fibers which are then fired to obtain the ceramic fibers. The metal compounds are typically metal compounds that are calcinable to metal oxides. Often the sol-gel formed fibers are crystalline or semicrystalline, which are known in the art as polycrystalline fibers.

Examples of solutions or dispersions of metal compounds to form fibers according to the sol-gel process include aqueous solutions of an oxygen-containing zirconium compounds, such as zirconium diacetate, containing colloidal silica, such as disclosed in U.S. Pat. No. 3,709,706. A further example includes an aqueous solution of water-soluble or dispersible aluminum and boron compounds, such as aqueous basic aluminum acetate, or a two-phase system comprising an aqueous mixture of a colloidal dispersion of silica and water-soluble or dispersible aluminum and boron compounds. Other representative refractory metal oxide fibers which can be made in through a sol-gel process include zirconia, zircon, zirconia-calcia, alumina, magnesium aluminate, aluminum silicate, and the like. Such fibers additionally can contain various metal oxides, such as iron oxide, chromia, and cobalt oxide.

Ceramic fibers which are useful in the ceramic fiber layer of the mounting mat include polycrystalline oxide ceramic fibers such as mullites, alumina, high alumina aluminosilicates, aluminosilicates, zirconia, titania, chromium oxide and the like. Preferred fibers, which are typically high alumina, crystalline fibers, comprise aluminum oxide in the range from about 67 to about 98 percent by weight and silicon oxide in the range from about 33 to about 2 percent by weight. These fibers are commercially available, for example, under the trade designation "NEXTEL 550" from the 3M Company, SAFFIL™ available from Dyson Group PLC (Sheffield, UK), MAFTEC available from Mitsubishi Chemical Corp. (Tokyo, Japan), FIBERMAX™ from Unifrax, (Niagara Falls, N.Y.), and ALTRA fibers (Rath GmbH, Germany).

Suitable polycrystalline oxide ceramic fibers further include aluminoborosilicate fibers preferably comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). The aluminoborosilicate fibers preferably are at least 50 percent by weight crystalline, more preferably, at least 75 percent, and most preferably, about 100% (i.e., crystalline fibers). Aluminoborosilicate fibers are commercially available, for example, under the trade designations "NEXTEL 312" and "NEXTEL 440" from the 3M Company.

The ceramic fibers obtainable through a sol-gel process are typically shot free or contain a very low amount of shot, typically less than 1% by weight based on total weight of the ceramic fibers. Also, the ceramic fibers will typically have an average diameter between 1 and 16 micrometers. In a preferred embodiment, the ceramic fibers have an average diameter of 5 µm or more and preferably the ceramic fibers are free or essentially free of fibers having a diameter of less than 3 µm, more preferably the ceramic fiber layer will be free or essentially free of fibers that have a diameter of less than 5 µm. Essentially free here means that the amount of such small diameter fibers is not more than 2% by weight, preferably not more than 1% by weight of the total weight of fibers in the ceramic fiber layer. Accordingly, in a particularly preferred embodiment of the present invention the ceramic fiber layer and the glass fiber layer and any further optional layers are essentially free of fibers that have a diameter of less than 3 µm. The ceramic fibers are generally individualized as described above for the glass fibers.

According to a method for making the nonwoven mat, chopped, individualized fibers (preferably, about 2.5 to about 5 cm in length) are fed into a conventional web-forming machine (commercially available, for example, under the trade designation "RANDO WEBBER" from Rando Machine Corp. of Macedon, N.Y.; or "DAN WEB" from ScanWeb Co. of Denmark), wherein the fibers are drawn onto a wire screen or mesh belt (e.g., a metal or nylon belt). If a "DAN WEB"-type web-forming machine is used, the fibers are preferably individualized using a hammer mill and then a blower. To facilitate ease of handling of the mat, the mat can be formed on or placed on a scrim. Depending upon the length of the fibers, the resulting mat typically has sufficient handleability to be transferred to a needle punch machine without the need for a support (e.g., a scrim).

The nonwoven mat can also be made using conventional wet-forming or textile carding. For wet forming processes, the fiber length is preferably about 0.5 to about 6 cm.

The mounting mat is preferably a needle-punched nonwoven mat. A needle-punched nonwoven mat refers to a mat wherein there is physical entanglement of fibers provided by multiple full or partial (preferably, full) penetration of the mat, for example, by barbed needles. The nonwoven mat can be needle punched using a conventional needle punching apparatus (e.g., a needle puncher commercially available under the trade designation "DILO" from Dilo of Germany, with barbed needles (commercially available, for example, from Foster Needle Company, Inc., of Manitowoc, Wis.)) to provide a needle-punched, nonwoven mat. Needle punching, which provides entanglement of the fibers, typically involves compressing the mat and then punching and drawing barbed needles through the mat. The optimum number of needle punches per area of mat will vary depending on the particular application. Typically, the nonwoven mat is needle punched to provide about 5 to about 60 needle punches/cm². Preferably, the mat is needle punched to provide about 10 to about 20 needle punches/cm².

Alternatively the mat can be stitchbonded using conventional techniques (see e.g., U.S. Pat. No. 4,181,514 (Lefkowitz et al.), the disclosure of which is incorporated herein by reference for its teaching of stitchbonding nonwoven mats). Typically, the mat is stitchbonded with organic thread. A thin layer of an organic or inorganic sheet material can be placed on either or both sides of the mat during stitchbonding to prevent or minimize the threads from cutting through the mat. Where it is desired that the stitching thread not decompose in use, an inorganic thread, such as ceramic or metal (e.g., stainless steel) can be used. The spacing of the stitches is usually from 3 to 30 mm so that the fibers are uniformly compressed throughout the entire area of the mat.

The glass fiber layer and ceramic fiber layer may be separately formed according to the process described above and the so obtained separate needle punched or stitchbonded layers may then be bonded to each other through needle punching or stitchbonding. Alternatively, a web of the glass fiber layer and ceramic fiber layer may be formed and this web may then be needle punched or stitchbonded to form a non-woven mounting mat. Accordingly, in the latter configuration, the glass fiber layer and ceramic fiber layer are not separately needle punched or stitchbonded before being bonded to each other.

The invention is further described with reference to the following examples without however the intention to limit the invention thereto.

EXAMPLES

Materials Used in the Examples and Comparative Examples

A. Mats of Ceramic Fibers Obtainable from a Sol-Gel Process (Polycrystalline Fibers)

A1 Maftec™ MLS-3 needle-bonded blanket from Mitsubishi Chemical company (72% $Al_2O_3$, 28% $SiO_2$ without binder, bulk density 0.16 g/cc)

A2 Ibiden™ N4 (72% $Al_2O_3$, 28% $SiO_2$ with binder, bulk density 0.18 g/cc)

A3 3M 1101 HT (72% $Al_2O_3$, 28% $SiO_2$ with binder, bulk density 0.14 g/cc)

A4 3M 1100 HT (96% $Al_2O_3$, 4% $SiO_2$ with binder, bulk density 0.16 g/cc)

A5 3M Nextel™ 312 needle-bonded mat (62% $Al_2O_3$, 24% $SiO_2$, 14% $B_2O_3$ without binder, bulk density 0.14 g/cc)

B. Glass Fiber Mat

B R Glass fibers were made into a non-woven mat as follows:

40 liters of R glass fibers (typical composition 60% $SiO_2$, 25% $Al_2O_3$, 9% CaO, and 6% MgO) having a diameter of ca. 10 µm, chopped to a length of 36 mm, were obtained from Saint-Gobain Vetrotex Deutschland GmbH, Herzogenrath, Germany. The fibers were essentially shot free.

The glass fibers were opened in a two-zone Laroche opener. The first zone had a feed speed of 2 m/min and a Lickerin roll speed of 2,500 rev/min. The second zone had a feed speed of 4 m/min and a Lickerin roll speed of 2,500 rev/min. The output speed was 6.5 m/min.

The opened fibers were then fed into a conventional web-forming machine (commercially available under the trade designation "Rando Webber" from Rando Machine Corp. of Macedon, N.Y., wherein the fibers were blown onto a porous metal roll to form a continuous web. The continuous web was then needle-bonded on a conventional needle tacker. The needle speed was 100 cycles/min and the output speed was 1.1 m/min. The "weight per area" of the mounting mat could be adjusted as desired. The material had a bulk density of approximately 0.12 g/cc.

Test Method—Real Condition Fixture Test (RCFT)

This test models actual conditions found in a pollution control device with a catalyst-coated monolith or diesel particulate filter during typical use, and measures the pressure exerted by the mounting material under those modeled use conditions. The RCFT method is described in detail in *Material Aspects in Automotive Pollution Control Devices*, ed. Hans Bode, Wiley-VCH, 2002, pp.-206-208.

Two 50.8 mm by 50.8 mm heated stainless steel platens, controlled independently, were heated to different temperatures to simulate the metal housing and monolith temperatures, respectively. Simultaneously, the space or gap between platens was increased by a value calculated from the temperature and the thermal expansion coefficients of a typical pollution control device of the type specified. High speed driving conditions for the pollution control device are simulated by a monolith temperature of up to 900° C. and a metal housing temperature of up to 530° C.

Three cycles of the RCFT were performed on each mounting mat sample. The density of the mat when mounted in the test sample and bulk density before mounting are summarized in Table 2.

The pressure exerted by the mat is measured continuously as temperature of the first and second plates were first increased, held at peak temperature for 15 minutes and then reduced. The plate representing the monolith temperature is heated from room temperature to 900° C., held for 15 seconds, and returned to room temperature. Simultaneously, the plate representing the shell temperature is heated from room temperature to 530° C., held for 15 seconds, and returned to room temperature. Each of these heating cycles is referred to as one RCFT cycle. After the three RCFT cycles were run, data in Table 2 were recorded.

Pressure was recorded at room temperature at the start of the test as well as pressure at peak temperature (900° C./500° C.) for the $1^{st}$ and $3^{rd}$ cycles, respectively.

Example 1

The mounting mat of Example 1 consisted of a layer of mat of A1 having a bulk density of 0.16 g/cc placed on top of a layer of mat B having a bulk density of 0.12 g/cc. The combined mat had a bulk density of approximately 0.14 g/cc. See Table 1 below.

The real condition fixture test (RCFT) was conducted by the method described above under Test Method. The two layer mat of Example 1 was tested by placing the polycrystalline fiber layer side of the mat towards the hotter side of the RCFT test assembly and the R glass fiber layer side of the mat towards the cooler side of the RCFT test assembly and compressing the dual layer mat to a mount density of 0.35 g/cc prior to the start of the test. This resulted in a starting pressure at room temperature of 217 kPa.

RCFT results are summarized in Table 2. During the first temperature cycle, the mat showed a pressure of 55 kPa at the peak temperature. During the third temperature cycle, the mat showed a pressure of 43 kPa at the peak temperature. This pressure is such as to hold the monolith in place without crushing it.

Comparative Example 1

Comparative Example 1 comprised a mat having a single layer of needle-bonded, polycrystalline fibers having a composition of 72% $Al_2O_3$ and 28% $SiO_2$. The bulk density before testing was approximately 0.16 g/cc. It was compressed to a mount density of 0.35 g/cc prior to the start of the test. This resulted in a starting pressure at room temperature of 257 kPa. RCFT results showed that pressure at peak temperature of the first cycle was 104 kPa. Pressure at peak temperature during the $3^{rd}$ cycle was 88 kPa.

Comparative Example 2

Comparative Example 2 comprised a mat having a single layer of R-Glass fibers having a bulk density of about 0.12 g/cc. It was compressed to a mount density of 0.32 g/cc prior to the start of the test. This resulted in a starting pressure at room temperature of 250 kPa. RCFT results showed that pressure at peak temperature during the first cycle was 10 kPa. Pressure at peak temperature during the $3^{rd}$ cycle was 0 kPa.

Comparative Example 3

Comparative Example 3 was performed using the mat described in Example 1. The two layer mat was placed in the test assembly with the R-glass towards the hot side of the RCFT and the polycrystalline fiber layer towards the cool side of the RCFT, an arrangement opposite to that of Example 1. The mat was compressed to a mount density of 0.35 g/cc prior to the start of the test. This resulted in starting pressure at room temperature of 281 kPa.

RCFT data showed that the pressure at peak temperature during the first cycle was 6 kPa The peak pressure at peak temperature during the $3^{rd}$ cycle was 5 kPa.

Comparative Examples 4-7

Comparative Examples 4-7 were conducted using single layers of polycrystalline fibers, respectively, described in detail above under "Materials used in the Examples and Comparative Examples".

RCFT results are summarized in Table 2.

TABLE 1

Mat Constructions

| Example | Layer 1 Material | Bulk Density | Layer 2 Material | Bulk Density | Overall Bulk density (g/cm³) |
|---|---|---|---|---|---|
| 1 | A1 | 0.16 g/cc | B | 0.12 g/cc | 0.14 g/cc |
| C1 | A1 | 0.16 g/cc | | | 0.16 g/cc |
| C2 | B | 0.12 g/cc | | | 0.12 g/cc |
| C3 | B | 0.12 g/cc | A1 | 0.16 g/cc | 0.14 g/cc |
| C4 | A2 | 0.18 g/cc | | | 0.18 g/cc |
| C5 | A3 | 0.14 g/cc | | | 0.14 g/cc |
| C6 | A4 | 0.16 g/cc | | | 0.16 g/cc |
| C7 | A5 | 0.14 g/cc | | | 0.14 g/cc |

TABLE 2

RCFT Results

| Example | Mat type | Mount density, (g/cm³) | Initial pressure, 23° C. (kPa) | Pressure at peak temp. (900/530)* for cycle 1 (kPa) | Pressure at peak temp. (900/530)* for cycle 3 (kPa) |
|---|---|---|---|---|---|
| 1 | A1/B | 0.35 | 217 | 55 | 43 |
| C1 | A1 | 0.35 | 257 | 104 | 88 |
| C2 | B | 0.32 | 250 | 10 | 0 |
| C3 | B/A1 | 0.35 | 281 | 6 | 5 |

TABLE 2-continued

RCFT Results

| Example | Mat type | Mount density, (g/cm³) | Initial pressure, 23° C. (kPa) | Pressure at peak temp. (900/530)* for cycle 1 (kPa) | Pressure at peak temp. (900/530)* for cycle 3 (kPa) |
|---|---|---|---|---|---|
| C4 | A2 | 0.35 | 216 | 95 | 86 |
| C5 | A3 | 0.35 | 147 | 51 | 48 |
| C6 | A4 | 0.35 | 127 | 43 | 40 |
| C7 | A5 | 0.35 | 135 | 67 | 61 |

*900° C./530° C., peak temperatures of the hot side (representing monolith temperature) and cooler side (representing shell temperature) of the assembly, respectively, during the test.

The invention claimed is:

1. A mounting mat for mounting a pollution control element in a pollution control device, the mounting mat having a bulk density of 0.12 to 0.3 g/cm³, said mounting mat comprising
   (i) a non-intumescent layer of magnesium aluminium silicate glass fibers, wherein the magnesium aluminium silicate glass fibers contain less than 1% by weight shot, based on the total weight of the magnesium aluminium silicate glass fibers; and
   (ii) a non-intumescent layer of polycrystalline ceramic fibers obtainable through a sol-gel process, wherein the polycrystalline ceramic fibers contain less than 1% by weight shot, based on total weight of the polycrystalline ceramic fibers.

2. A mounting mat according to claim 1 wherein said layer of magnesium aluminium silicate glass fibers and said layer of ceramic fibers define opposite major surfaces of said mat.

3. A mounting mat according to claim 1 wherein said layer of magnesium aluminium silicate glass fibers comprises said glass fibers in an amount of at least 90% by weight based on the weight of said layer.

4. A mounting mat according to claim 1 wherein one or more further layers are present between said layer of magnesium aluminium silicate glass fibers and said layer ceramic fibers.

5. A mounting mat according to claim 1 wherein said glass fibers and said ceramic fibers have a number average diameter of 5 µm or more and a length of 0.5 to 15 cm.

6. A mounting mat according to claim 1 wherein said mounting mat is free of organic binder or contains said organic binder in an amount of not more than 2% by weight based on the weight of said mat.

7. A mounting mat according to claim 1 wherein said aluminium silicate glass fibers comprise aluminium oxide in an amount of 10 to 30% by weight, silicon dioxide in an amount of 52 to 70% by weight and magnesium oxide in an amount of 1 to 12% by weight based on the total weight of the glass fiber and wherein the weight percentages of aluminium oxide, silicon dioxide and magnesium oxide are calculated on a theoretical basis as $Al_2O_3$, $SiO_2$ and MgO respectively.

8. A mounting mat according to claim 1 wherein said aluminium silicate glass fibers are selected from the group consisting of E-glass, S-glass, S2-glass, R-glass and mixture thereof.

9. A mounting mat according to claim 1 wherein said polycrystalline ceramic fibers are obtained by a sol-gel process.

10. A mounting mat according to claim 1 wherein said glass fibers are chopped glass fibers.

11. A pollution control device comprising a pollution control element arranged in a casing with a mounting mat according to claim 1, said mat being disposed between said casing and said pollution control element.

12. A pollution control device according to claim 11 wherein said mounting mat is arranged such that said layer of ceramic fibers is disposed between said layer of magnesium aluminium silicate glass fibers and said pollution control element.

13. A pollution control device according to claim 12 wherein said pollution control element is a monolith comprising between 400 and 1200 cells per square inch, with cell walls having a thickness of not more than 0.005" (0.127 mm).

14. A pollution control device according to claim 12 wherein said layer of polycrystalline ceramic fibers thermally insulates said layer of magnesium aluminium silicate glass fibers from said pollution control element.

15. A pollution control device according to claim 14 wherein the mounting mat is needle-punched.

16. A pollution control device according to claim 11 wherein the mount density of said mounting mat is between 0.2 and 0.6 g/cm³.

17. A pollution control device according to claim 16 wherein said pollution control element is a monolith comprising between 400 and 1200 cells per square inch, with cell walls having a thickness of not more than 0.005" (0.127 mm).

18. A pollution control device according to claim 11 wherein said glass fibers and said ceramic fibers have a number average diameter of 5 µm or more and a length of 0.5 to 15 cm.

19. A pollution control device according to claim 11 wherein said mounting mat is free of organic binder or contains said organic binder in an amount of not more than 2% by weight based on the weight of said mat.

20. A mounting mat according to claim 1 wherein said layer of magnesium aluminium silicate glass fibers is essentially free of fibers other than magnesium aluminium silicate glass fibers, and said layer of polycrystalline ceramic fibers is essentially free of fibers other than polycrystalline ceramic fibers.

21. A mounting mat according to claim 1 wherein the mounting mat is needle-punched.

* * * * *

UNITED STATES PATENT AND TRADEMARK OFFICE
CERTIFICATE OF CORRECTION

PATENT NO. : 7,854,904 B2  
APPLICATION NO. : 10/556271  
DATED : December 21, 2010  
INVENTOR(S) : Merry It is certified that error appears in the above-identified patent and that said Letters Patent is hereby corrected as shown below:

Col. 11, line 40, delete "layer" and insert --layer of--.

Col. 11, line 54, delete "of the" and insert --of said--.

Col. 12, line 5, delete "and mixture" and insert --and a mixture--.

Col. 12, line 17, after "layer of" insert --polycrystalline--.

Signed and Sealed this  
Twelfth Day of July, 2011

David J. Kappos  
*Director of the United States Patent and Trademark Office*